United States Patent
Lee et al.

(10) Patent No.: US 10,342,034 B2
(45) Date of Patent: Jul. 2, 2019

(54) METHOD FOR REPORTING CELL STATUS INFORMATION IN WIRELESS COMMUNICATION SYSTEM AND AN APPARATUS THEREFOR

(71) Applicant: LG Electronics Inc., Seoul (KR)

(72) Inventors: Sunyoung Lee, Seoul (KR); Sunghoon Jung, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 14/650,928

(22) PCT Filed: Jan. 9, 2014

(86) PCT No.: PCT/KR2014/000242
§ 371 (c)(1),
(2) Date: Jun. 10, 2015

(87) PCT Pub. No.: WO2014/112745
PCT Pub. Date: Jul. 24, 2014

(65) Prior Publication Data
US 2015/0319773 A1  Nov. 5, 2015

Related U.S. Application Data

(60) Provisional application No. 61/753,926, filed on Jan. 17, 2013.

(51) Int. Cl.
*H04W 72/12* (2009.01)
*H04W 28/02* (2009.01)
(Continued)

(52) U.S. Cl.
CPC ....... *H04W 72/1278* (2013.01); *H04W 24/10* (2013.01); *H04W 28/0205* (2013.01);
(Continued)

(58) Field of Classification Search
None
See application file for complete search history.

(56) References Cited

U.S. PATENT DOCUMENTS 8,917,605 B2 * 12/2014 Pelletier .............. H04W 52/365
370/236
2008/0219212 A1   9/2008 Kim
(Continued)

FOREIGN PATENT DOCUMENTS

| KR | 10-2005-0116562 A | 12/2005 |
|----|-------------------|---------|
| WO | 2012/028205 A1    | 3/2012  |
| WO | 2012/047005 A2    | 4/2012  |

OTHER PUBLICATIONS

Evolved Universal Terrestrial Radio Access (E-UTRA); Medium Access Control (MAC) protocol specification—3GPP TS 36.321 V 10.0.0 (Dec. 2010).*
(Continued)

*Primary Examiner* — Yemane Mesfin
*Assistant Examiner* — Jeff Banthrongsack
(74) *Attorney, Agent, or Firm* — Morgan, Lewis & Bockius LLP

(57) ABSTRACT

A method for reporting cell activation status information at a user equipment (UE) in a wireless communication system is disclosed. The method includes a step of reporting, to a network, the cell activation status information for a plurality of cells configured to the UE when a condition is met, wherein the cell activation status information for the plurality of cells indicates whether each of the plurality of cells is activated or deactivated.

11 Claims, 12 Drawing Sheets

(51) Int. Cl.
    *H04W 24/10*     (2009.01)
    *H04W 76/20*     (2018.01)
    *H04W 88/02*     (2009.01)
    *H04W 88/08*     (2009.01)
    *H04W 24/02*     (2009.01)

(52) U.S. Cl.
    CPC ............ *H04W 76/20* (2018.02); *H04W 24/02* (2013.01); *H04W 88/02* (2013.01); *H04W 88/08* (2013.01)

(56) References Cited

U.S. PATENT DOCUMENTS

| | | |
|---|---|---|
| 2010/0130211 A1 | 5/2010 | Bae et al. |
| 2012/0106370 A1 | 5/2012 | Radulescu et al. |
| 2012/0140689 A1* | 6/2012 | Pelletier .............. H04W 76/048 370/311 |
| 2012/0257570 A1* | 10/2012 | Jang ...................... H04W 76/19 370/328 |
| 2013/0114398 A1* | 5/2013 | Wang .................. H04W 76/048 370/221 |
| 2013/0190011 A1 | 7/2013 | Kim et al. |

OTHER PUBLICATIONS

Written Opinion and International Search Report dated Apr. 21, 2014 for corresponding International application No. PCT/KR2014/000242.

International Search Report issued in corresponding International Patent Application No. PCT/KR2014/000242 dated Apr. 21, 2014.

\* cited by examiner

FIG. 3
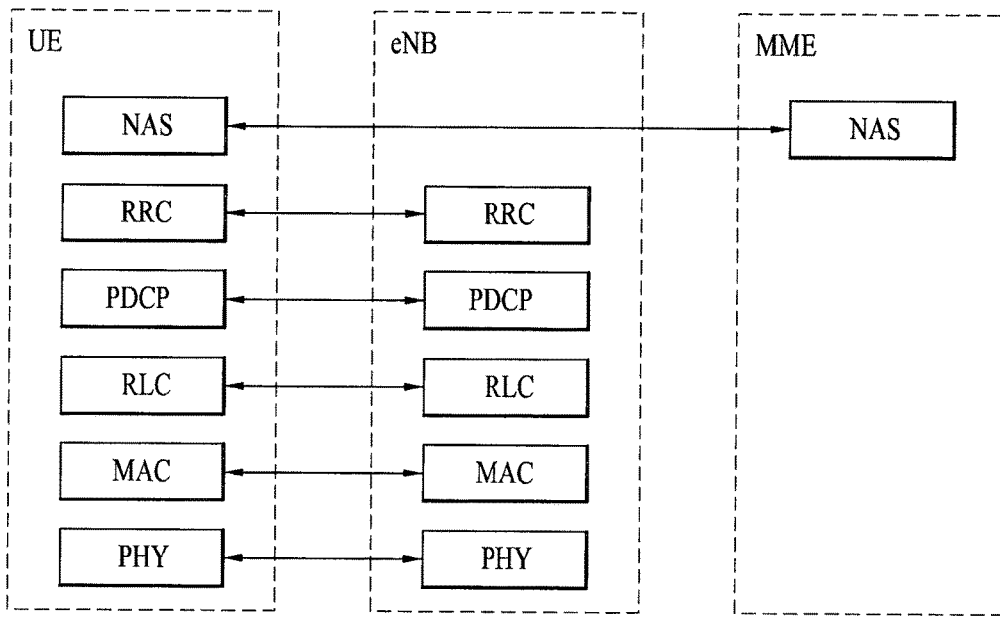
(a) Control-plane protocol stack
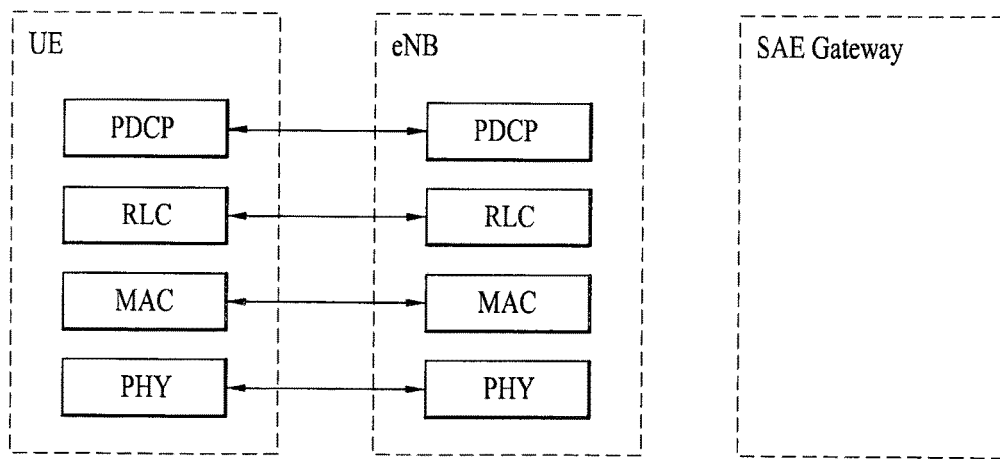
(b) User-plane protocol stack

FIG. 9

| $C_7$ | $C_6$ | $C_5$ | $C_4$ | $C_3$ | $C_2$ | $C_1$ | R | Oct 1

METHOD FOR REPORTING CELL STATUS INFORMATION IN WIRELESS COMMUNICATION SYSTEM AND AN APPARATUS THEREFOR

TECHNICAL FIELD

The present invention relates to a wireless communication system and, more particularly, to a method for reporting cell status information in a wireless communication system and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for reporting cell status information in a wireless communication system and an apparatus therefor.

Technical Solution

In accordance with an embodiment of the present invention, a method for reporting cell activation status information at a user equipment (UE) in a wireless communication system includes reporting, to a network, the cell activation status information for a plurality of cells configured to the UE when a condition is met, wherein the cell activation status information for the plurality of cells indicates whether each of the plurality of cells is activated or deactivated. Here, the plurality of cells is not a cell which is always activated.

Preferably, the condition comprises a reception of a command for reporting the cell activation status information, or a deactivation of at least one cell among the plurality of cells, or an activation of at least one cell among the plurality of cells.

More preferably, the cell activation status information for the plurality of cells comprises bitmap information indicates whether each of the plurality of cells is activated or deactivated.

More preferably, the step of reporting the cell activation status information comprises reporting the cell activation status information periodically.

Preferably, the method may further comprise a step of receiving information on the condition from the network.

Further, the method may further comprise a step of starting a timer when a command for activating at least one cell among the plurality of cells is received. In this case, the method may further comprise a step of stopping the timer when a command for deactivating the at least one cell is received.

It is to be understood that both the foregoing general description and the following detailed description of the present invention are exemplary and explanatory and are intended to provide further explanation of the invention as claimed.

Advantageous Effects

According to embodiments of the present invention, the user equipment can efficiently report cell status information in the wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 3 is a diagram showing a control plane and a user plane of a radio interface protocol between a User Equipment (UE) and an Evolved Universal Terrestrial Radio Access Network (E-UTRAN) based on a 3rd Generation Partnership Project (3GPP) radio access network standard.

FIG. 9 is a diagram showing the structure of Activation/Deactivation MAC control element.

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
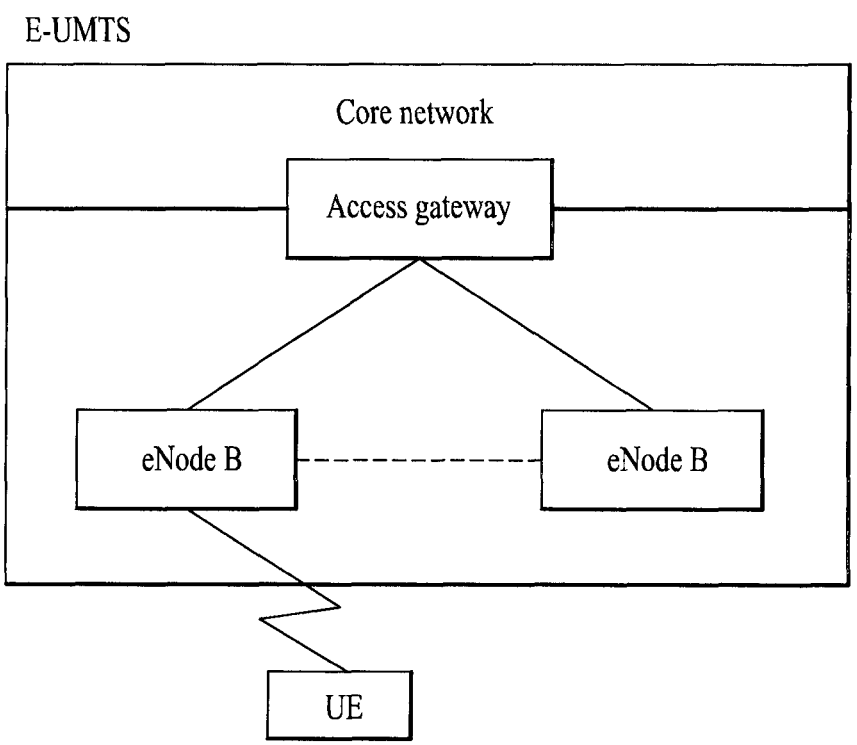
FIG. 1 is a diagram showing a network structure of an Evolved Universal Mobile Telecommunications System (E-UMTS) as an example of a wireless communication system.
Figure 2:
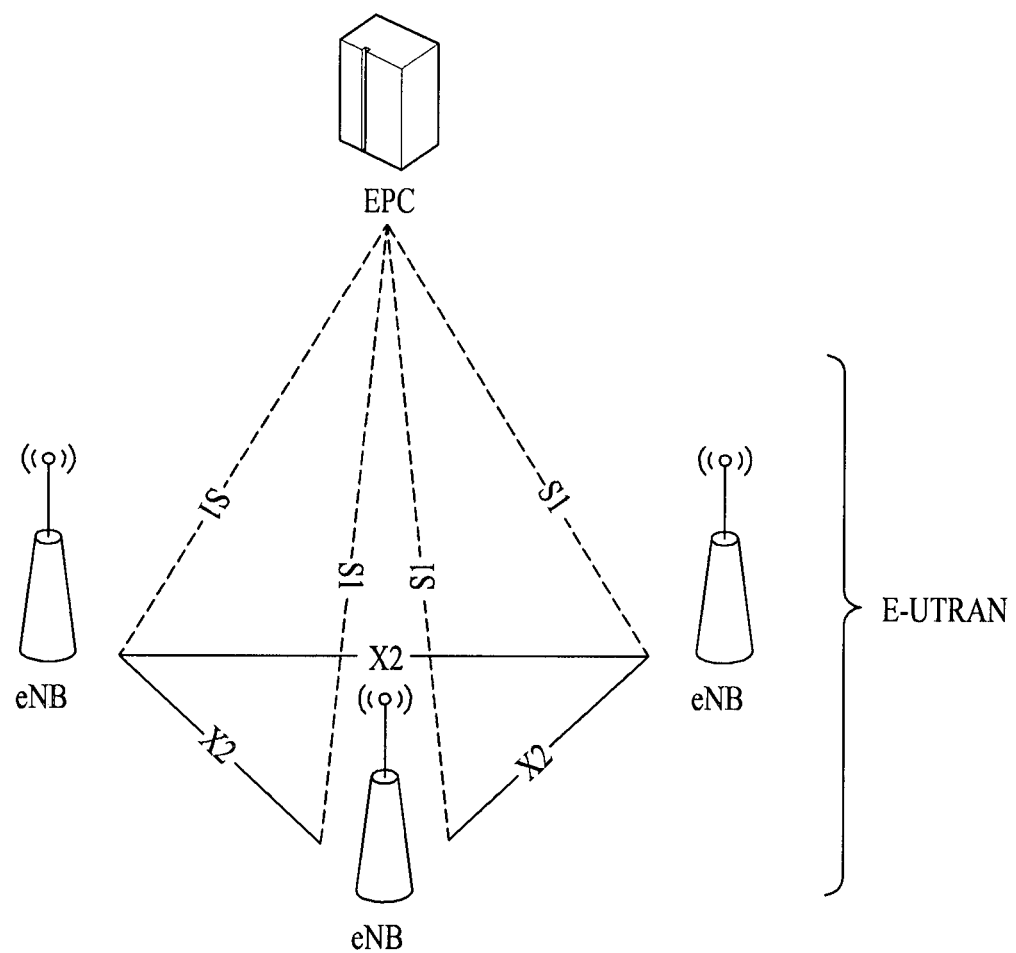
FIG. 2 is a diagram showing the concept of a network structure of an Evolved Universal Terrestrial Radio Access Network (E-UTRAN).

FIG. 2 is a diagram showing the concept of a network structure of an Evolved Universal Terrestrial Radio Access Network (E-UTRAN). In particular, the E-UTRAN system is a system evolved from the existing UTRAN system. The E-UTRAN includes cells (eNBs) and cells are connected via an X2 interface. A cell is connected to a user equipment (UE) via an air interface and is connected to an evolved packet core (EPC) via an S1 interface.

The EPC includes a mobility management entity (MME), a serving-gateway (S-GW) and a packet data network-gateway (PDN-GW). The MME has access information of a UE and information about capabilities of the UE. Such information is mainly used for mobility management of the UE. The S-GW is a gateway having an E-UTRAN as an end point and the PDN-GW is a gateway having a PDN as an end point.

FIG. 3 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A medium access control (MAC) layer, a radio link control (RLC) layer and a packet data convergence protocol (PDCP) layer may be located in a second layer. The MAC layer of the second layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size suitable for enabling a lower layer to transmit data in a radio interval. The RLC layer provides three modes, namely, a transparent mode (TM), an unacknowledged mode (UM) and an acknowledged mode (AM) to support a variety of QoS requested by each radio bearer (RB). Especially, for reliable data transmission, the AM RLC performs a function to retransmit data through automatic repeat request (ARQ).

The packet data convergence protocol (PDCP) layer of the second layer performs a header compression function for reducing the size of an IP packet header which is relatively great in size and includes unnecessary control information in order to efficiently transmit IP packets, such as IPv4 or IPv6 packets, in a radio interval with a relatively narrow bandwidth. Accordingly, only necessary information need be included in the header part of data for transmission, so as to increase transmission efficiency of a radio interval. In the LTE system, the PDCP layer also performs a security function. The security function includes a ciphering function for preventing data monitoring from a third party, and an integrity protection function for preventing third party data manipulation.

A radio resource control (RRC) layer of the third layer is defined only in the control plane. The RRC layer handles logical channels, transport channels and physical channels for the configuration, re-configuration and release of radio bearers (RBs). Here, a radio bearer (RB) denotes a service provided by the second layer for data transfer between the UE and the network. The RRC layers of the UE and the network exchange RRC messages with each other.

The RB may be broadly divided into two bearers, that is, a signaling radio bearer (SRB) used to transmit an RRC message on a control plane and a data radio bearer (DRB) used to transmit user data on a user plane. The DRB may be divided into a UM DRB using UM RLC and AM DRB using AM RLC according to method for operating RLC.

Hereinafter, an RRC state of a UE and an RRC connection method will be described. The RRC state, which indicates whether the RRC layer of the UE is logically connected to the RRC layer of the E-UTRAN, is called an RRC_CONNECTED state if the RRC layers are connected and is called an RRC_IDLE state if the RRC layers are not connected.

Since the E-UTRAN detects presence of a UE in an RRC_CONNECTED state in cell units, it is possible to efficiently control the UE. In contrast, the E-UTRAN cannot detect a UE in an RRC_IDLE state in cell units and a core network (CN) manages the UE in an RRC_IDLE state in units of TA which is greater than a cell. That is, the UE in the RRC_IDLE state transitions to the RRC_CONNECTED state in order to receive a service such as voice or data from a cell.

In particular, when a user first turns a UE on, the UE searches for an appropriate cell and then camps on an RRC_IDLE state in the cell. The UE in the RRC_IDLE state performs an RRC connection establishment process with the RRC layer of the E-UTRAN to transition to the RRC_CONNECTED state when RRC connection needs to be established. The RRC connection needs to be established when uplink data transmission is necessary due to call connection attempt of a user, when a response message is transmitted in response to a paging message received from the E-UTRAN, etc.

A non-access stratum (NAS) layer located above the RRC layer performs a function such as session management and mobility management. In the NAS layer, two states such as an EPS mobility management-REGISTERED (EMM-REGISTERED) state and an EMM-UNREGISTERED state are defined in order to manage mobility of a UE. These two states are applied to the UE and the MME. A UE is first in the EMM-UNREGISTERED state and performs a process of registering with a network through an initial attach procedure in order to access the network. If the attach procedure is successfully performed, the UE and the MME enter the EMM-REGISTERED STATE.

In the NAS layer, in order to manage signaling connection between the UE and the EPC, an EPS connection management (ECM)-IDLE state and an ECM_CONNECTED state are defined and applied to the UE and the MME. If a UE in the ECM-IDLE state is RRC connected to the E-UTRAN, the UE enters the ECM-CONNECTED state. If the MME in the ECM-IDLE state is S1 connected to the E-UTRAN, the MME enters the ECM-CONNECTED state.

When the UE is in the ECM-IDLE state, the E-UTRAN does not have context information of the UE. Accordingly, the UE in the ECM-IDLE state performs a UE-based mobility associated procedure, such as cell selection or reselection, without receiving a command of the network. In contrast, if the UE is in the ECM-CONNECTED state, mobility of the UE is managed by the command of the network. If the location of the UE is changed in the ECM-IDLE state, the UE informs the network of the location thereof via a tracking area (TA) update procedure.

In an LTE system, one cell configuring an eNB is configured to use a bandwidth such as 1.25, 2.5, 5, 10, 15 or 20 MHz to provide a downlink or uplink transmission service to several UEs. Different cells may be configured to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH).

Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
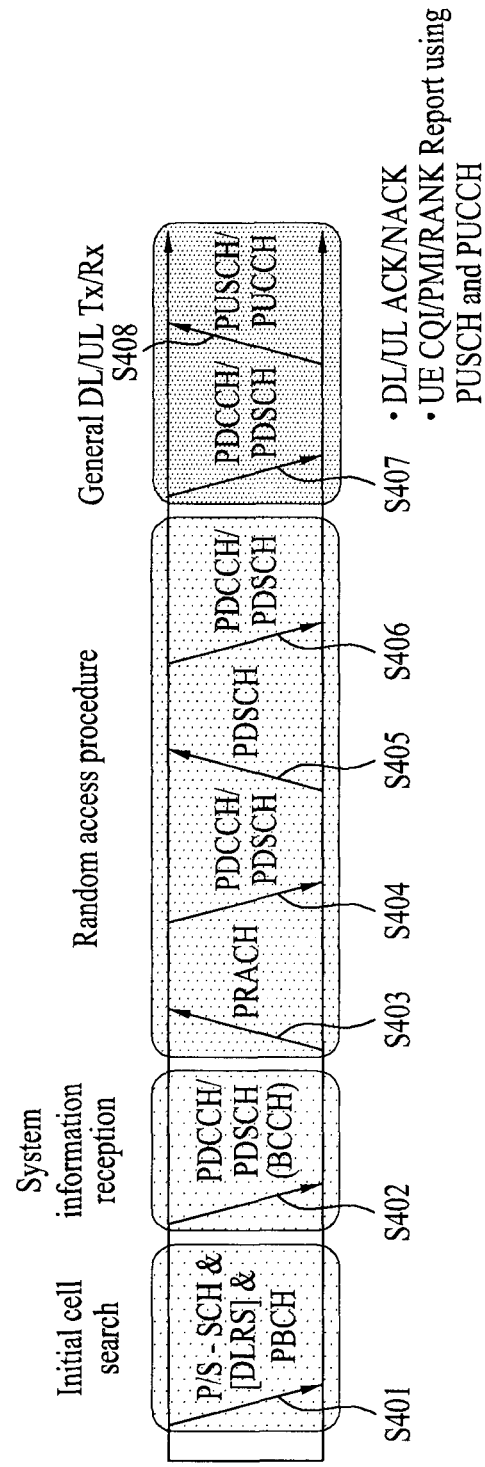
FIG. 4 is a diagram showing physical channels used in a 3GPP system and a general signal transmission method using the same.

FIG. 4 is a diagram showing physical channels used in a 3GPP system and a general signal transmission method using the same.

A UE performs an initial cell search operation such as synchronization with an eNB when power is turned on or the UE enters a new cell (S401). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE which has completed the initial cell search may receive a Physical Downlink Control Channel (PDCCH) and a Physical Downlink Shared Channel (PDSCH) according to information included in the PDCCH so as to acquire more detailed system information (S402).

Meanwhile, if the eNB is initially accessed or radio resources for signal transmission are not present, the UE may perform a Random Access Procedure (RACH) (step S403 to S406) with respect to the eNB. In this case, the UE may transmit a specific sequence through a Physical Random Access Channel (PRACH) as a preamble (S403), and receive a response message to the preamble through the PDCCH and the PDSCH corresponding thereto (S404). In case of contention based RACH, a contention resolution procedure may be further performed.

The UE which has performed the above procedures may perform PDCCH/PDSCH reception (S407) and Physical Uplink Shared Channel PUSCH)/Physical Uplink Control Channel (PUCCH) transmission (S408) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In case of the 3GPP LTE system, the UE may transmit the control information such as CQI/PMI/RI through the PUSCH and/or the PUCCH.

Figure 5:
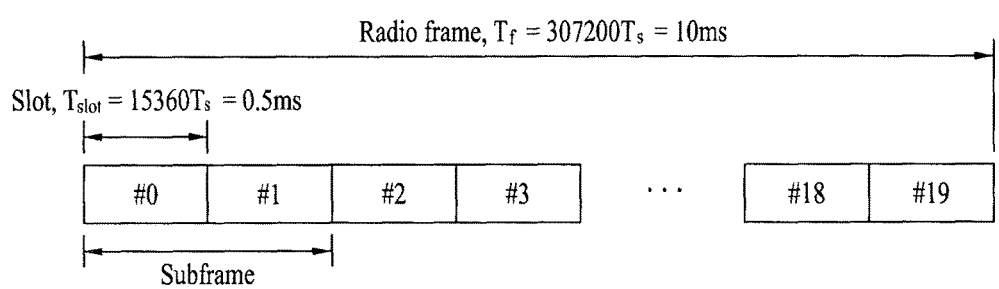
FIG. 5 is a diagram showing the structure of a radio frame used in a Long Term Evolution (LTE) system.

FIG. 5 is a diagram showing the structure of a radio frame used in a Long Term Evolution (LTE) system.

Referring to FIG. 5, the radio frame has a length of 10 ms (327200×$T_s$) and includes 10 subframes with the same size. Each subframe has a length of 1 ms and includes two slots. Each slot has a length of 0.5 ms (15360×$T_s$). $T_s$ denotes a sampling time, and is represented by $T_s$=1/(15 kHz×2048) =3.2552×$10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A Transmission Time Interval (TTI) which is a unit time for transmission of data may be determined in units of one or more subframes. The structure of the radio frame is only exemplary and the number of subframes included in the radio frame, the number of slots included in the subframe, or the number of OFDM symbols included in the slot may be variously changed.

Hereinafter, a random access procedure will be described in greater detail. The UE may perform a random access procedure in the following cases:

when the UE performs initial access because RRC connection with the eNB is not established, when the UE initially accesses a target cell in a handover procedure, when the random access procedure is requested by a command of a base station, when uplink data transmission is performed in a situation in which uplink time synchronization is not performed or in a situation in which specific radio resources used for requesting radio resources are not allocated, and when a recovery procedure is performed in case of a radio link failure or a handover failure.

In the LTE system, a non-contention based random access procedure of, at an eNB, allocating a dedicated random access preamble to a specific UE and, at the UE, performing the random access procedure using the random access preamble is provided. In other words, there are two procedures in selection of a random access preamble: one is a contention based random access procedure in which the UE randomly selects one preamble within a specific group for use, another is a non-contention based random access procedure in which a random access preamble allocated only to a specific UE by the eNB is used. The above-described random access procedures are performed differently in contention occurring due to competition as will be described below. The non-contention based random access procedure may be used, as described above, only in the handover procedure or when the random access procedure is requested by the eNB.

In the contention based random access procedure, the UE randomly selects one random access preamble from a set of random access preambles indicated via system information or a handover command and selects and transmits PRACH resources for transmitting the random access preamble.

The UE attempts to receive a random access response thereof within a random access response reception window indicated by the eNB via system information or a handover command, after transmitting the random access preamble. More specifically, the random access response information is transmitted in the form of a MAC PDU and the MAC PDU is delivered via a PDSCH. In addition, in order to enable the UE to appropriately receive the information delivered via the PDSCH, a PDCCH is also delivered. That is, the PDCCH includes information about the UE which will receive the PDSCH, frequency and time information of radio resources of the PDSCH and a transmission format of the PDSCH.

Once the UE has successfully received the PDCCH, the UE appropriately receives the random access response transmitted via the PDSCH according to the information about the PDCCH. The random access response includes a random access preamble identifier, uplink grant, a temporary cell identifier (C-RNTI) and timing advance commands (TACs). The reason why the random access preamble identifier is necessary is because random access response information for one or more UEs is included in one random access response and thus for which UE the uplink grant, temporary C-RNTI and TACs are valid should be indicated. The random access preamble identifier matches the random access preamble selected by the UE.

If the UE has received a valid random access response, the UE processes information included in the random access response. That is, the UE applies the TAC and stores the temporary C-RNTI. In addition, the UE transmits data stored in the buffer of the UE or newly generated data to the eNB using the uplink grant. The identifier of the UE is necessarily included in data included in the uplink grant. In the contention based random access procedure, the eNB cannot determine which UE performs the random access procedure. However, for future contention resolution, the UE should be identified. In addition, there are two methods including the identifier of the UE.

In the first method, if a UE has a valid cell identifier allocated by a cell before the random access procedure, the UE transmits a cell identifier thereof in uplink. In contrast, if the UE is not allocated a valid cell identifier before the random access procedure, the UE transmits a unique identifier (e.g., S-TMSI or random id). In general, the unique identifier is longer than the cell identifier. If the UE transmits data via the UL grant, a contention resolution timer starts.

The UE transmits data including the identifier thereof via the uplink grant included in the random access response and then waits for an instruction of the eNB for contention resolution. That is, in order to receive a specific message, the UE attempts to receive a PDCCH. The method of receiving the PDCCH includes two methods. As described above, if the identifier transmitted via the uplink grant is a cell identifier, the UE attempts to receive the PDCCH using the cell identifier and, if the identifier is a unique identifier, the UE attempts to receive the PDCCH using the temporary C-RNTI included in the random access response.

Thereafter, in the former case, if the PDCCH is received via the cell identifier before the contention resolution timer has elapsed, the UE determines that the random access procedure has been normally performed and completes the random access procedure. In the latter case, if the PDCCH is received via the temporary cell identifier before the contention resolution timer has elapsed, data delivered via the PDSCH indicated by the PDCCH is checked. If the unique identifier of the UE is included in the data, the UE determines that the random access procedure has been normally performed and completes the random access procedure.

Additionally, unlike the contention based random access procedure, in the non-contention based random access procedure, when the random access response information is received, the UE determines that the random access procedures has been normally performed and completes the random access procedure.

As described above, the non-contention based random access procedure may be performed in a handover process or when the random access procedure is requested by a command of the eNB. Of course, the contention based random access procedure may be performed in a handover process or when the random access procedure is requested by a command of the eNB. First, for the non-contention based random access procedure, it is important to receive, from the eNB, a predetermined random access preamble which does not cause contention. In the method of receiving the random access preamble, a handover command and a PDCCH command may be used. The UE receives the random access preamble allocated thereto from the eNB and then transmits the preamble to the eNB.

The method of receiving the random access response information is equal to that of the contention based random access procedure.

Hereinafter, a carrier aggregation (CA) scheme of an LTE-A system will be described.

Figure 6:
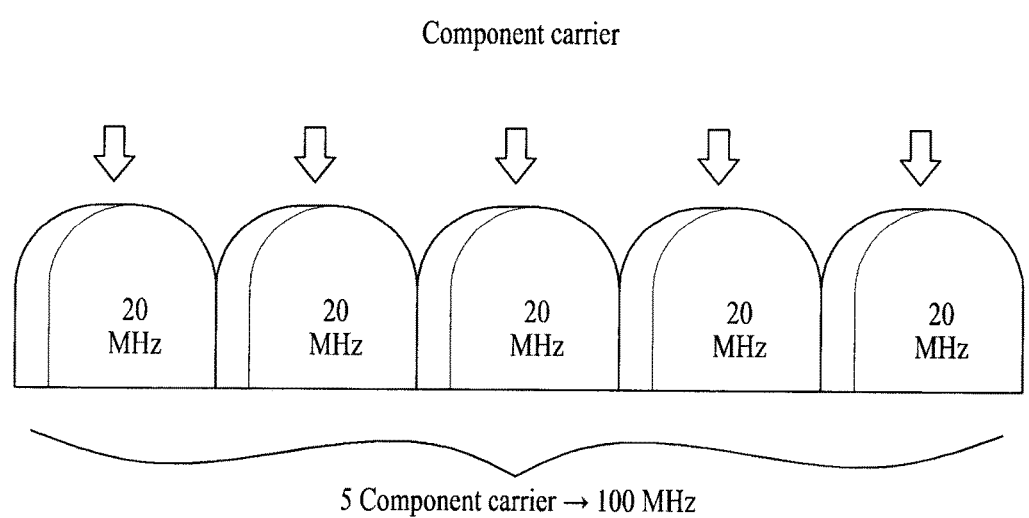
FIG. 6 is a diagram showing the concept of a carrier aggregation (CA) scheme of an LTE-A system.

FIG. 6 is a diagram showing the concept of a carrier aggregation (CA) scheme of an LTE-A system.

The LTE-A standard is a candidate of IMT-Advanced technology of the international telecommunication union (ITU) and is designed to satisfy requirements of IMT-Advanced technology of ITU. Accordingly, in LTE-A, in order to satisfy requirements of ITU, extension of bandwidth of an LTE system has been discussed. In order to extend bandwidth in the LTE-A system, a carrier of an LTE system is defined as a component carrier (CC) and a maximum of 5 CCs are combined and used. For reference, a serving cell may be composed of one downlink CC and one uplink CC. Alternatively, the serving cell may be composed of one downlink CC. Since the CC may have a maximum bandwidth of 20 MHz as in the LTE system, bandwidth may be extended to a maximum of 100 MHz. Technology for combining and using a plurality of CCs is referred to as CA.

If a CA scheme is applied, only one RRC connection is established between a UE and a network. Among a plurality of serving cells configured to be used by a UE, a serving cell for providing mobility information of a NAS layer and security input in order to establish or re-establish an RRC connection is referred to as a primary serving cell (PCell) and the other cells are referred to as secondary serving cells (SCells).

Figure 7:
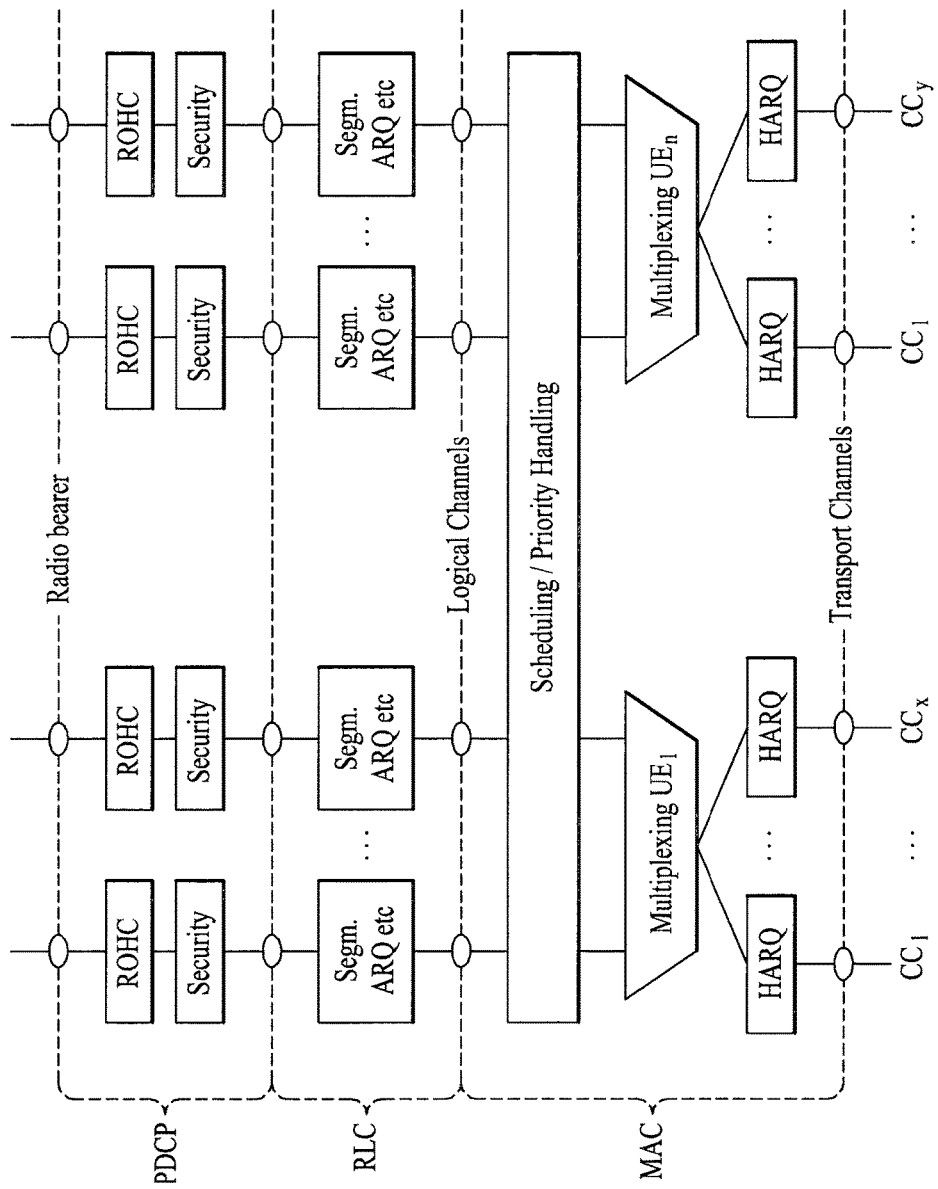
FIGS. 7 and 8 are diagrams showing the structure of a second downlink layer and a second uplink layer in case of applying a CA scheme.
Figure 8:
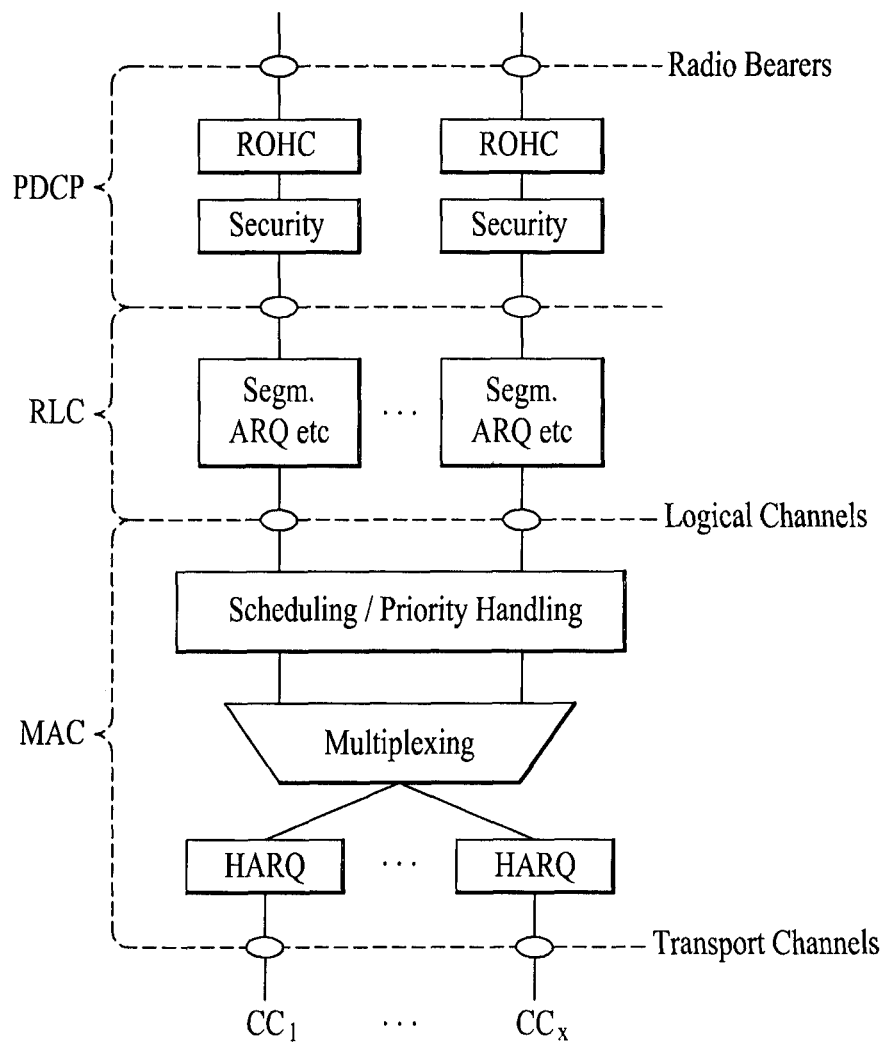

FIGS. 7 and 8 are diagrams showing the structure of a second downlink layer and a second uplink layer in case of applying a CA scheme.

Referring to FIGS. 7 and 8, the CA scheme influences a second layer and, more particularly, an MAC layer. For example, in CA, since a plurality of CCs is used and one HARQ entity manages one CC, an MAC layer of an LTE-A system should perform operations related to a plurality of HARQ entities. In addition, since transport blocks are independently processed, HARQ entities may transmit or receive a plurality of transport blocks at the same time via a plurality of CCs in CA.

Next, Timing Advance Group (TAG) in the carrier aggregation (CA) scheme will be described.

In the CA scheme, each of serving cells can have different frequency characteristic. If the uplink transmission is performed although the transmission timing for the serving cells are not obtained, inter-cell interference may be occurred. Therefore, a plurality of timing advance maintenance should be required.

If the UE uses a plurality of the serving cells, there are serving cells having similar timing synchronization characteristic based on the frequency characteristic. For example, the serving cells within a same frequency band may have similar timing synchronization characteristic.

In the CA scheme, in order to optimize signaling for adjusting multiple uplink timing synchronizations, the serving cells having similar timing synchronization characteristic are grouped and referred to as a TAG (Timing Advance Group).

The eNB transmits information about which TAG each of the serving cells are included in, via TAG-Id of a RRC layer signaling. The TAG-Id may have a value from 0 to the maximum number of TAGs which can be configured to a UE. One UE can have at least two TAGs. The TAG-Id having 0 indicates pTAG including a primary serving cell.

At least one serving cell of a plurality of serving cells included in one TAG should have an uplink connection. Further, there may be two or more serving cells having similar timing synchronization characteristic in a same TAG.

Next, Activation/Deactivation of SCells in the carrier aggregation (CA) scheme will be described.

To enable reasonable UE battery consumption when CA is configured, an activation/deactivation mechanism of SCells is supported (i.e. activation/deactivation does not apply to PCell). When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell), and is expected to be able to perform CQI measurements.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

At reconfiguration without mobility control information, SCells added to the set of serving cells are initially "deactivated" and SCells which remain in the set of serving cells (either unchanged or reconfigured) do not change their activation status ("activated" or "deactivated").

At reconfiguration with mobility control information (i.e. handover), SCells are "deactivated".

If the UE is configured with one or more SCells, the network may activate and deactivate the configured SCells. The PCell is always activated. The network activates and deactivates the SCell(s) by sending the Activation/Deactivation MAC control element. Furthermore, the UE maintains a sCellDeactivationTimer timer per configured SCell and deactivates the associated SCell upon its expiry. The same initial timer value applies to each instance of the sCellDeactivationTimer and it is configured by RRC. The configured SCells are initially deactivated upon addition and after a handover.

Figure 9:
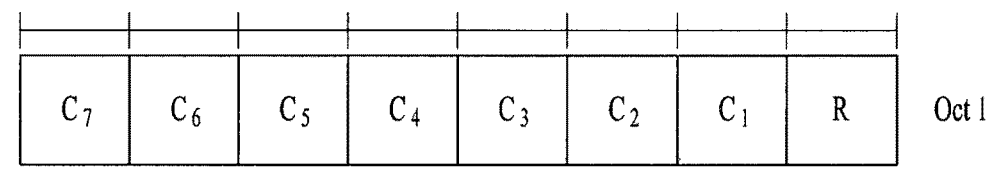

FIG. 9 is a diagram showing the structure of Activation/Deactivation MAC control element.

If the UE receives an Activation/Deactivation MAC control element in this TTI activating the SCell, the UE shall activate the SCell and start or restart the sCellDeactivationTimer associated with the SCell, in the TTI. Here, said activating the SCell means applying normal SCell operation including SRS transmissions on the SCell, CQI/PMI/RI/PTI reporting for the SCell, PDCCH monitoring on the SCell and PDCCH monitoring for the SCell.

Else, if the UE receives an Activation/Deactivation MAC control element for deactivating the SCell in this TTI or if the sCellDeactivationTimer associated with the activated SCell expires in this TTI, the UE shall deactivate the SCell, stop the sCellDeactivationTimer associated with the SCell and flush all HARQ buffers associated with the SCell.

Further, if PDCCH on the activated SCell indicates an uplink grant or downlink assignment or if PDCCH on the Serving Cell scheduling the activated SCell indicates an uplink grant or a downlink assignment for the activated SCell, the UE shall restart the sCellDeactivationTimer associated with the SCell.

If the SCell is deactivated, the UE shall not transmit SRS on the SCell, not report CQI/PMI/RI/PTI for the SCell, not transmit on UL-SCH on the SCell, not transmit on RACH on the SCell, not monitor the PDCCH on the SCell, and not monitor the PDCCH for the SCell.

More specifically, although the eNB transmits the Activation/Deactivation MAC control element for deactivating the SCell, the UE may lost the Activation/Deactivation MAC control element because of a radio link error. Therefore, the UE may assume that the SCell is deactivated when the SCell is not used during a predetermined duration. This predetermined duration is indicated by said sCellDeactivationTimer. The sCellDeactivationTimer is defined for each of a plurality of SCells. When the UE receives the Activation/Deactivation MAC control element for a specific SCell, the UE shall start the sCellDeactivationTimer corresponding to the specific SCell. Further, when the UE receives the Activation/Deactivation MAC control element for activating the specific SCell or receives an uplink grant (or a downlink assignment) for the specific SCell, the UE shall re-start the sCellDeactivationTimer corresponding to the specific SCell.

When the UE receives the Activation/Deactivation MAC control element for deactivating the specific SCell or the sCellDeactivationTimer corresponding to the specific SCell is expired, the UE shall stop the sCellDeactivationTimer corresponding to the specific SCell and deactivate the specific SCell.

When an SCell is added for a UE upon reception of the sCellToAddModList from the eNB, the SCell is initially "deactivated". Thus, the SCell can be used for data transmission after the SCell is activated by the eNB. To activate the SCell, the eNB sends the Activation/Deactivation MAC CE that activates the SCell using bitmap settings.

Because the MAC signaling can be lost due to the radio condition, the eNB may have different understanding of the status of the sCell. In the prior art, there is no mechanism for the eNB to confirm that the UE successfully received the MAC signaling and activates the corresponding sCell.

In this invention, when the UE is configured with sCells, the UE can inform the eNB of activation/deactivation status for the configured sCells by transmitting a MAC signaling including indication of activation/deactivation status of sCells. The eNB configures the sCells to the UE by an RRC signaling including the identifier of the sCell (sCellIndex).

When the eNB configures the UE to report the activation/deactivation status of sCells, the eNB sends an RRC signaling or a MAC signaling, including i) Reporting type, ii) Reporting criterion, iii) One or multiple sCell identifiers.

The reporting type can be either "immediate" or "by criterion".

When the UE receives the RRC/MAC signaling with reporting type from the eNB and configured to report the activation/deactivation status, if the reporting type is set to "immediate", the UE immediately sends the activation/deactivation status report upon reception of it. If the reporting type is set to "by criterion", the UE sends the activation/deactivation status report when the reporting criterion is met.

If reporting type is not included, the UE sends the activation/deactivation status report according to the default reporting type. The default reporting type can be either "immediate" or "by criterion", and can be pre-set.

When the UE receives the RRC/MAC signaling with one or more sCell identifiers and configured to report the activation/deactivation status, the UE considers the activation/deactivation status of the sCells indicated by the sCell identifier is subject to be reported.

If there is no sCell identifier included, the UE considers that the activation/deactivation status of all configured sCells, or a certain sCell such as a timing reference serving cell or a pathloss reference serving cell is subject to be reported.

The reporting criterion can be set as Periodicity of reporting or Event of reporting.

Here, the periodicity is defined by the time duration, the number of subframes, or TTI. Further, Event of reporting is defined as a) when the UE receives the Activation/Deactivation MAC CE from the eNB, b) when activation/deactivation status for any of the concerned sCell is changed, c) when activation/deactivation status for any of the concerned sCell is deactivated, d) when activation/deactivation status for any of the concerned sCell is activated, or e) when activation/deactivation status for any of the concerned sCell is supposed to be deactivated in N subframes or N TTIs, where N is configurable or predefined value.

When the UE receives the RRC/MAC signaling including the reporting criterion, and is configured to report the activation/deactivation status, the UE sends the activation/deactivation status of the reporting moment when the reporting criterion is met.

When the UE reports the activation/deactivation status of the sCells, the UE can report the status of only the concerned sCells, or the status of all the configured sCells.

If the UE reports to the eNB the activation/deactivation status of only the concerned sCells, the UE sends the MAC signaling that contains additional information such as the activation/deactivation status of "activated" or "deactivated" and sCell identifier.

If the UE reports to the eNB the activation/deactivation status of all the configured sCells, the UE sends the MAC signaling that contains additional information such as a bitmap which indicates timeAlignmentTimer status of the corresponding TAG. The bitmap is set to 1 to indicate that the timeAlignmentTimer of the corresponding TAG is running and is set to 0 to indicate the timeAlignmentTimer of the corresponding TAG is not running.

Figure 10:
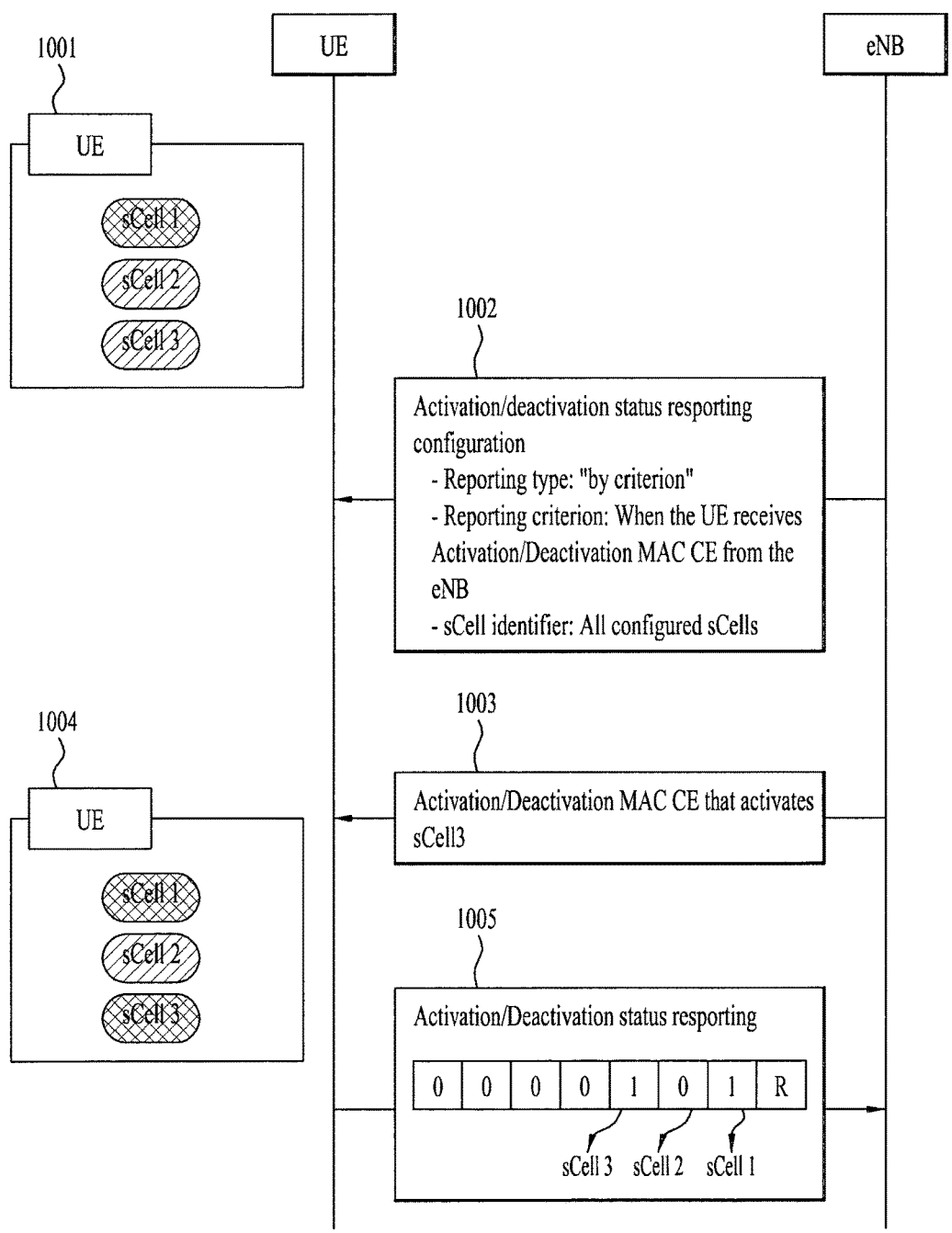
FIG. 10 is a flow chart for reporting activation/deactivation status information according to the present application.

FIG. 10 is a flow chart for reporting activation/deactivation status information according to the present application. Especially, in FIG. 10, the UE is requested to report the activation/deactivation status of all configured sCells upon receiving the Activation/Deactivation MAC CE from the eNB.

Referring to FIG. 10, the UE is configured with a sCell1, a sCell2 and a sCell3, such as S1001. The sCell1 is activated.

In S1002, the eNB configures the UE to report the activation/deactivation status of all configured sCells when the UE receives the Activation/Deactivation MAC CE from the eNB. The eNB sends an Activation/Deactivation MAC CE that activates sCell3 of sTAG, in S1003.

In S1004, the sCell3 of the UE is activated. Then, in S1005, the UE reports the activation/deactivation status of all configured sCell, i.e., sCell1, sCell2, and sCell3, to the eNB using an MAC signaling including a bitmap of the sCells. The bitmap is set to 0 to indicate "deactivated" and to 1 to indicated "activated".

Figure 11:
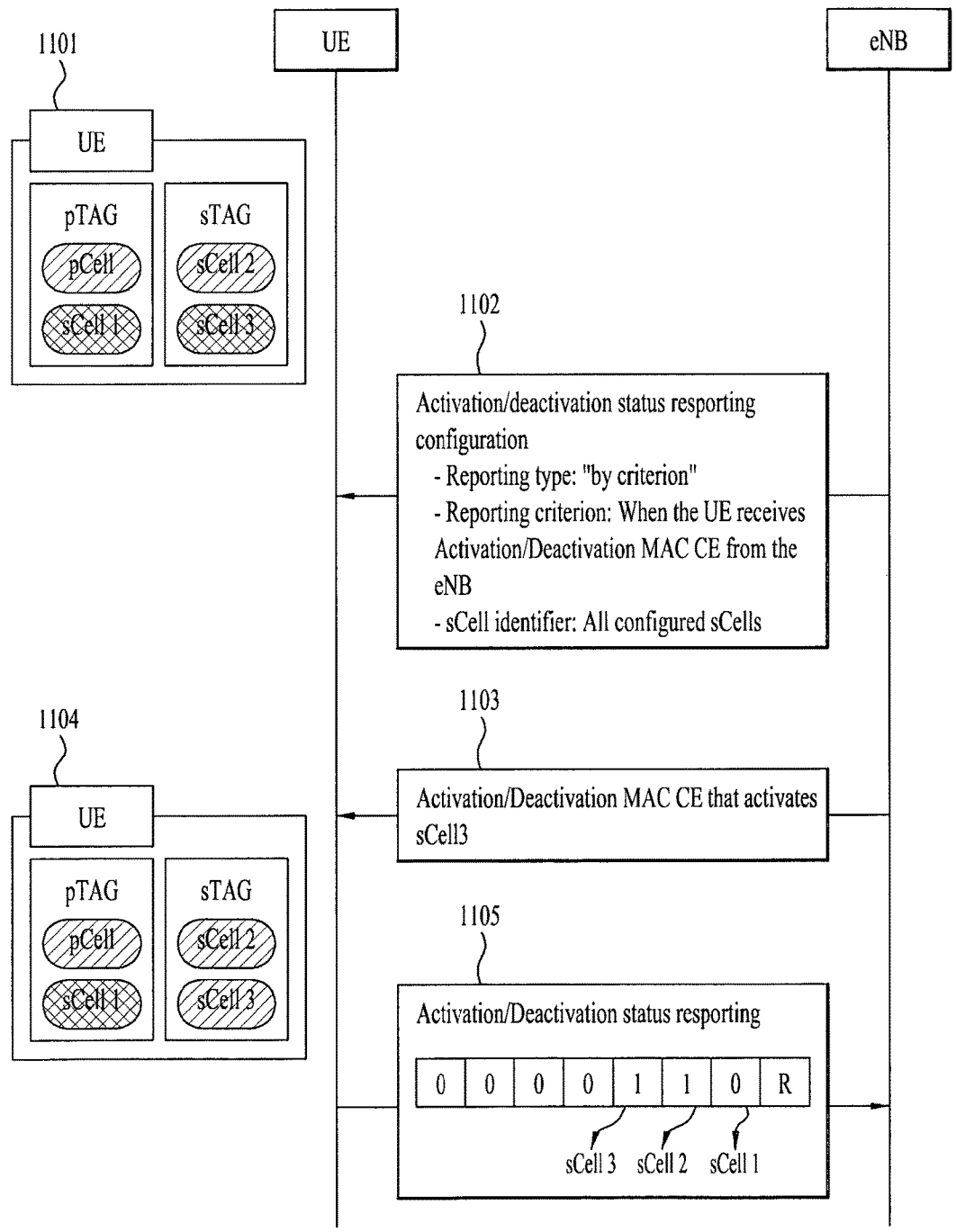
FIG. 11 is an another flow chart for reporting activation/deactivation status information according to the present application.

FIG. 11 is an another flow chart for reporting activation/deactivation status information according to the present application. Especially, in FIG. 11, the UE is also requested to report the activation/deactivation status of all configured sCells upon receiving the Activation/Deactivation MAC CE from the eNB.

Referring to FIG. 11, the UE is configured with 2 TAGs. A pTAG contains a pCell and a sCell1, and A sTAG contains a sCell2 and a sCell3, such as S1101. The pCell is always activated and the sCell2 is activated.

In S1102, the eNB configures the UE to report the activation/deactivation status of all configured sCells when the UE receives the Activation/Deactivation MAC CE from the eNB. The eNB sends an Activation/Deactivation MAC CE that activates sCell3 of sTAG, in S1103.

In S1104, the sCell3 of the UE is activated. Then, in S1105, the UE reports the activation/deactivation status of all configured sCell, i.e., sCell1, sCell2, and sCell3, to the eNB using an MAC signaling including a bitmap of the sCells. The bitmap is set to 0 to indicate "deactivated" and to 1 to indicated "activated".

Figure 12:
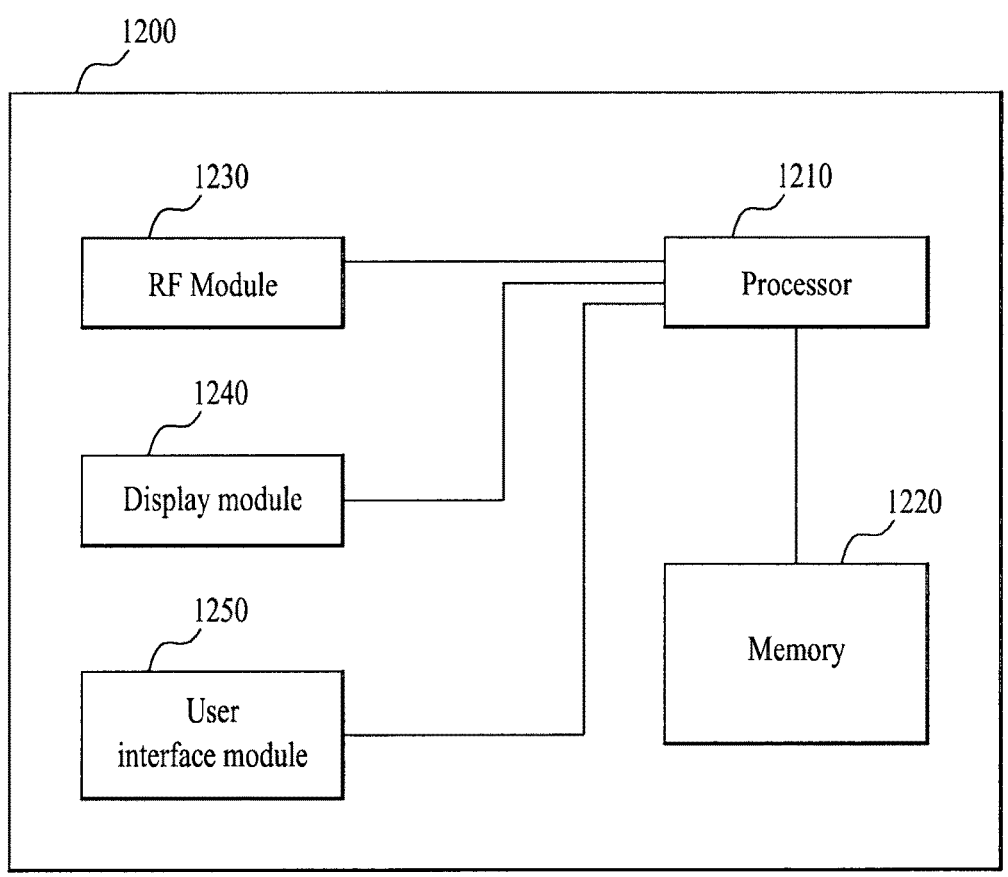
FIG. 12 is a block diagram of a communication apparatus according to an embodiment of the present invention.

FIG. 12 is a block diagram illustrating a communication apparatus in accordance with an embodiment of the present invention.

Referring to FIG. 12, a communication device 1200 includes a processor 1210, a memory 1220, an Radio Frequency (RF) module 1230, a display module 1240, and a user interface module 1250.

The communication device 1200 is illustrated for convenience of the description and some modules may be omitted. Moreover, the communication device 1200 may further include necessary modules. Some modules of the communication device 1200 may be further divided into sub-modules. The processor 1210 is configured to perform operations according to the embodiments of the present invention exemplarily described with reference to the figures. Specifically, for the detailed operations of the processor 1210, reference may be made to the contents described with reference to FIGS. 1 to 10.

The memory 1220 is connected to the processor 1210 and stores operating systems, applications, program code, data, and the like. The RF module 1230 is connected to the processor 1210 and performs a function of converting a baseband signal into a radio signal or converting a radio signal into a baseband signal. For this, the RF module 1230 performs analog conversion, amplification, filtering, and frequency upconversion or inverse processes thereof. The display module 1240 is connected to the processor 1210 and displays various types of information. The display module 1240 may include, but is not limited to, a well-known element such as a Liquid Crystal Display (LCD), a Light Emitting Diode (LED), or an Organic Light Emitting Diode (OLED). The user interface module 1250 is connected to the processor 1210 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for reporting cell status information in a wireless communication system has been described centering on an example applied to the 3GPP LTE system, the present invention is applicable to a variety of wireless communication systems in addition to the 3GPP LTE system.

The invention claimed is:

1. A method for reporting cell activation status information for one or more cells to a network at a user equipment (UE) in a wireless communication system, the method comprising:
receiving, from the network, a message for reporting the cell activation status information,
wherein the message includes:
first information on a condition for reporting the cell activation status information, and
second information on a reporting type for reporting the cell activation status information, and
wherein the reporting type is one of a conditional reporting or an immediate reporting;
reporting the cell activation status information to the network based on the message,
wherein, if the reporting type is the conditional reporting, the cell activation status information is reported when the condition is met,
wherein, if the reporting type is the immediate reporting, the cell activation status information is reported immediately, wherein the cell activation status information informs of whether each of the one or more cells is activated or deactivated, and wherein the one or more cells are configured into a timing advance group (TAG); and after the cell activation status information is reported to the network, reporting a bitmap information for time alignment timer (TAT) status of the TAG, wherein, if the TAT of the TAG is running, a field of the bitmap information is set to 1, and wherein, if the TAT of the TAG is not running, the field of the bitmap information is set to 0.

2. The method of claim 1, wherein the one or more cells are not cells that are always activated.

3. The method of claim 1, wherein, if the reporting type is the immediate reporting, the cell activation status information is reported to the network upon receipt of the message.

4. The method of claim 1, wherein the condition comprises a deactivation of at least one cell among the one or more cells.

5. The method of claim 1, wherein the condition comprises an activation of at least one cell among the one or more cells.

6. The method of claim 1, wherein the condition comprises a predetermined time before a deactivation of at least one cell among the one or more cells.

7. The method of claim 1, wherein the cell activation status information for the one or more cells comprises bitmap information for whether each of the one or more cells is activated or deactivated.

8. The method of claim 1, wherein the reporting the cell activation status information comprises reporting the cell activation status information periodically.

9. The method of claim 1, further comprising starting a deactivation timer when a command for activating at least one cell among the one or more cells is received.

10. The method of claim 9, further comprising stopping the deactivation timer when a command for deactivating the at least one cell is received.

11. A user equipment (UE) for reporting cell activation status information for one or more cells to a network in a wireless communication system, the UE comprising:

a radio frequency (RF) module; and a processor operably connected to the RF module, the processor being configured to:

control the RF module to receive, from the network, a message for reporting the cell activation status information, wherein the message includes:
first information on a condition for reporting the cell activation status information, and
second information on a reporting type for reporting the cell activation status information, and
wherein the reporting type is one of a conditional reporting or an immediate reporting;

control the RF module to report the cell activation status information to the network based on the message, wherein, if the reporting type is the conditional reporting, the cell activation status information is reported when the condition is met, wherein, if the reporting type is the immediate reporting, the cell activation status information is reported immediately, wherein the cell activation status information informs of whether each of the one or more cells is activated or deactivated, and wherein the one or more cells are configured into a timing advance group (TAG); and after the cell activation status information is reported to the network, control the RF module to report a bitmap information for time alignment timer (TAT) status of the TAG, wherein, if the TAT of the TAG is running, a field of the bitmap information is set to 1, and wherein, if the TAT of the TAG is not running, the field of the bitmap information is set to 0.

* * * * *